United States Patent
Trafton et al.

(10) Patent No.: US 9,991,608 B2
(45) Date of Patent: Jun. 5, 2018

(54) WIRE AND METHODS FOR PREPARING A WIRE TO RECEIVE A CONTACT ELEMENT

(71) Applicant: General Cable Technologies Corporation, Highland Heights, KY (US)

(72) Inventors: Michael L. Trafton, Lake Orion, MI (US); Robert D. Steiner, Macomb, MI (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days. days.

(21) Appl. No.: 15/587,799

(22) Filed: May 5, 2017

(65) Prior Publication Data

US 2017/0244178 A1    Aug. 24, 2017

Related U.S. Application Data

(63) Continuation of application No. 14/873,237, filed on Oct. 2, 2015, now Pat. No. 9,647,348.

(Continued)

(51) Int. Cl.
*H01R 4/18* (2006.01)
*H01B 7/02* (2006.01)
(Continued)

(52) U.S. Cl.
CPC ............. *H01R 4/184* (2013.01); *H01B 1/023* (2013.01); *H01B 1/026* (2013.01); *H01B 7/02* (2013.01);
(Continued)

(58) Field of Classification Search
CPC ...... H01R 4/184; H01R 4/625; H01R 11/281; H01R 3/0207; H01B 1/023; H01B 1/026; H01B 7/02; H01B 13/0036
(Continued)

(56) References Cited

U.S. PATENT DOCUMENTS 2,655,641 A    10/1953  Asaff
2,815,497 A *  12/1957  Redslob ................ H01R 4/62
                                                    174/90
(Continued)

FOREIGN PATENT DOCUMENTS

GB    2349018 A    10/2000
JP    7115276 A    5/1995
(Continued)

OTHER PUBLICATIONS

Arbes, Carl J.; Non-Final Office Action issued in U.S. Appl. No. 14/873,237; dated Nov. 17, 2016; 7 pages.
(Continued)

*Primary Examiner* — Timothy Thompson
*Assistant Examiner* — Charles Pizzuto
(74) *Attorney, Agent, or Firm* — Ulmer & Berne LLP (57) ABSTRACT

A method is provided for preparing a wire for installation of a terminal. The method comprises removing an insulating layer from a conductor to expose a portion of a conductor. The method further includes attaching a conductive foil layer to a portion of the exposed portion of the conductor by applying pressure to the conductive foil layer. Terminated wires are also provided.

20 Claims, 9 Drawing Sheets

Related U.S. Application Data (60) Provisional application No. 62/059,317, filed on Oct. 3, 2014.

(51) Int. Cl.
| | | |
|---|---|---|
| *H01R 43/02* | (2006.01) | |
| *H01R 4/62* | (2006.01) | |
| *H01R 11/28* | (2006.01) | |
| *H01B 1/02* | (2006.01) | |
| *H01B 13/00* | (2006.01) | |

(52) U.S. Cl.
CPC ......... *H01B 13/0036* (2013.01); *H01R 4/625* (2013.01); *H01R 11/281* (2013.01); *H01R 43/0207* (2013.01)

(58) Field of Classification Search
USPC .............................................. 174/74 R, 84 C
See application file for complete search history.

(56) References Cited

U.S. PATENT DOCUMENTS

| | | | |
|---|---|---|---|
| 3,247,316 A | 4/1966 | Weimer, Jr. | |
| 3,364,460 A | 1/1968 | Bergan | |
| 3,541,227 A | 11/1970 | Bendrick | |
| 3,656,092 A * | 4/1972 | Swengel, Sr. | H01R 4/029 439/730 |
| 3,716,909 A | 2/1973 | Stokes et al. | |
| 3,955,044 A | 5/1976 | Hoffman et al. | |
| 3,988,563 A | 10/1976 | Swengel, Sr. et al. | |
| 4,030,967 A | 6/1977 | Ingrey et al. | |
| 5,425,832 A | 6/1995 | Kusano et al. | |
| 6,730,848 B1 | 5/2004 | Antaya et al. | |
| 7,282,679 B2 | 10/2007 | Reichinger | |
| 7,828,610 B2 * | 11/2010 | Lehmann | H01R 4/187 29/860 |
| 8,834,213 B2 | 9/2014 | Sato et al. | |
| 8,921,696 B2 * | 12/2014 | Otsuka | H01R 4/021 174/74 R |
| 9,172,151 B2 | 10/2015 | Sato | |
| 9,251,926 B2 | 2/2016 | Okada et al. | |
| 2004/0158981 A1 | 8/2004 | Antaya et al. | |
| 2006/0208838 A1 | 9/2006 | Beuscher et al. | |
| 2010/0096185 A1 * | 4/2010 | Otsuka | H01R 4/021 174/94 R |
| 2012/0329343 A1 * | 12/2012 | Sato | H01R 4/185 439/866 |
| 2013/0130569 A1 | 5/2013 | Sato | |

FOREIGN PATENT DOCUMENTS

| | | |
|---|---|---|
| JP | 2004-207172 A | 7/2004 |
| JP | 2007305314 A | 11/2007 |
| JP | 4326797 B2 | 9/2009 |
| WO | 2011118416 A1 | 9/2011 |
| WO | 2012048103 A1 | 4/2012 |
| WO | 2013145670 A1 | 10/2013 |
| WO | 2014114672 A1 | 7/2014 |

OTHER PUBLICATIONS

Copenheaver, Blaine R.; International Search Report and Written Opinion of the International Searching Authority, issued in International Application No. PCT/US2015/053738; dated Jan. 4, 2016; 9 pages.

Nguyen, Chau N.; Final Office Action issued in U.S. Appl. No. 15/185,272; dated Jan. 10, 2017; 10 pages.

Nguyen, Chau N.; Non-Final Office Action issued in U.S. Appl. No. 15/185,272; dated Sep. 7, 2016; 12 pages.

* cited by examiner

WIRE AND METHODS FOR PREPARING A WIRE TO RECEIVE A CONTACT ELEMENT

RELATED APPLICATIONS

This application is a continuation application of U.S. patent application Ser. No. 14/873,237, filed Oct. 2, 2015, which claims the benefit of U.S. Provisional Patent Application Ser. No. 62/059,317, filed Oct. 3, 2014, the contents of each of which are incorporated herein by reference.

TECHNICAL FIELD

The articles and methods described below generally relate to the field of preparing a wire to receive a contact element.

BACKGROUND

Automotive cables, such as a battery cable, can include an aluminum conductor which can be lighter and less expensive than conventional copper conductors. A contact element, such as a ring terminal, is crimped or otherwise secured to a bare end of the aluminum conductor to form a terminated end. The contact element is typically made from copper based alloys such as brass, for example, or another material that is different than aluminum.

The bare end of aluminum conductor, however, can be susceptible to oxidation (e.g., sapphire oxidation) which can inhibit conductivity between the bare end and the contact element and thus can prevent proper termination with a contact element. The aluminum conductor can also be susceptible to galvanic corrosion when it is terminated to a material that is more basic than aluminum, such as brass, and when moisture is present at the interface between the conductor and the contact element. The galvanic corrosion can cause aluminum dissolution which can adversely affect the conductivity between the aluminum conductor and the contact element. Once terminated, the aluminum conductor can be more susceptible to mechanical creep at its terminated end at low temperatures (e.g., 80 degrees C.) than conventional copper conductors which can result in undesirable impedances. The aluminum conductor is also weaker than a copper conductor which can result in the aluminum conductor being easier to pull out of the contact element after termination.

SUMMARY

In accordance with one embodiment, a method for preparing a wire to accept a contact element is provided. The wire comprises a conductor and an insulating layer surrounding the conductor. The conductor is formed of a first material. The method comprises removing the insulating layer from the conductor to expose a portion of the conductor. The method further comprises joining a conductive foil layer and at least a portion of the exposed portion of the conductor together. The conductive foil layer is formed of a second material.

In accordance with another embodiment, a method for installing a contact element on a wire is provided. The wire comprises a conductor. The conductor comprises an exposed portion and is formed of a first material. The method comprises joining a conductive foil layer and the exposed portion of the conductor together. The method further comprises securing the contact element to the exposed portion of the conductor and the conductive foil layer. The conductive foil layer is formed of a second material. The terminal is formed of a third material.

In accordance with yet another embodiment, a terminated wire comprises a conductor. The conductor comprises an exposed portion and is formed of a first material. The terminated wire is prepared by the process of joining a conductive foil layer and an exposed portion of the conductor together and securing a contact element to the exposed portion of the conductor and the conductive foil layer. The conductive foil layer is formed of a second material. The contact element is formed of a third material.

In accordance with yet another embodiment, a terminated wire comprises a wire, a conductive foil layer, and a contact element. The wire comprises a conductor. The conductor comprises an exposed portion and is formed of a first material. The conductive foil layer is formed of a second material. The contact element is formed of a third material. The conductive foil layer is joined to the exposed portion of the conductor. The terminal is secured to the exposed portion of the conductor and the conductive foil layer.

BRIEF DESCRIPTION OF THE DRAWINGS

It is believed that certain embodiments will be better understood from the following description taken in conjunction with the accompanying drawings in which.

DETAILED DESCRIPTION

Figure 1:
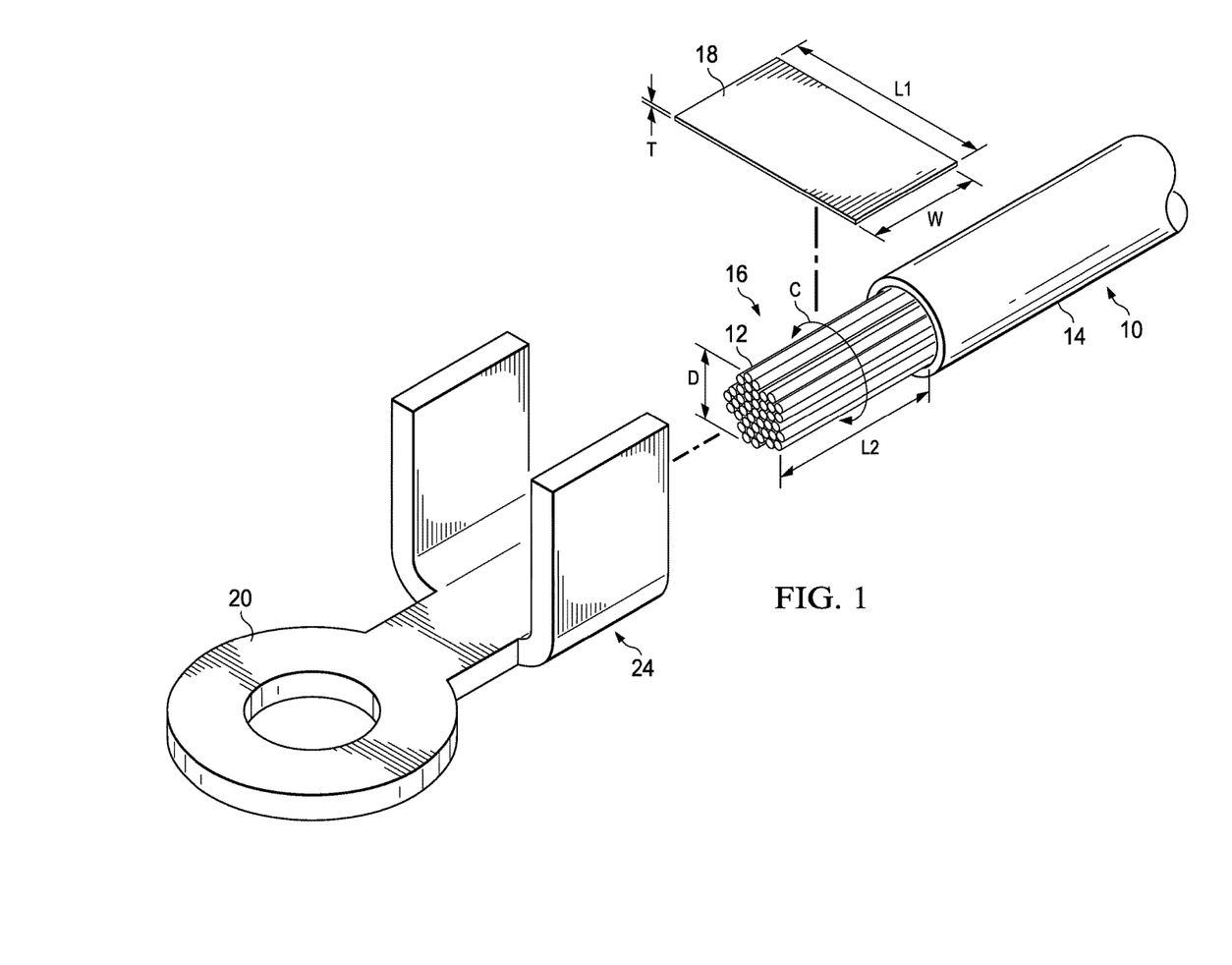
FIG. 1 is a perspective view depicting a wire, a conductive foil layer, and a terminal prior to the conductive foil layer being installed on a conductor of the wire, in accordance with one embodiment.

In connection with the views and examples of FIGS. 1-10, wherein like numbers indicate the same or corresponding elements throughout the views, FIG. 1 illustrates a wire 10 having a conductor 12 and an insulating layer 14 surrounding the conductor 12. A portion of the insulating layer 14 is shown to be removed from the conductor 12 to expose a bare portion 16 of the conductor 12. The insulating layer 14 can be removed with any of a variety of suitable methods, such as through interaction with a set of wire strippers. Although a multi-strand insulated conductor is shown, it will be appreciated that any of a variety of suitable alternative conductors can be used having different quantities/sizes of strands, including a conductor having an individual strand (e.g., a solid conductor) and/or being devoid of insulation (e.g., a grounding conductor).

Figure 2:
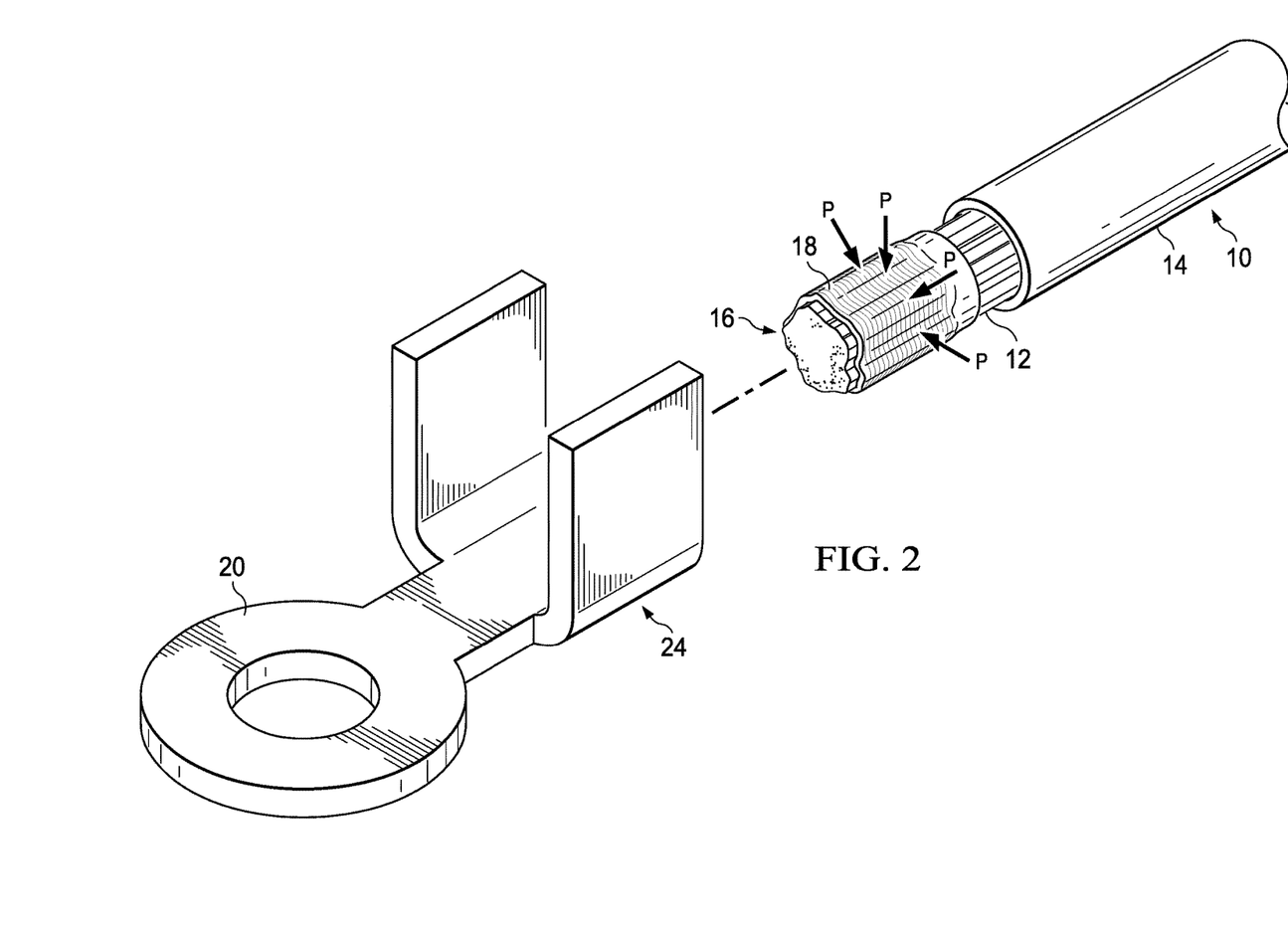
FIG. 2 is a perspective view depicting the conductive foil layer installed on the wire of FIG. 1.

As illustrated in FIGS. 1 and 2, a conductive foil layer 18 can be attached to a portion of the bare portion 16 of the conductor 12. In one embodiment, the conductive foil layer 18 can be wrapped around the bare portion 16 of the conductor 12, as illustrated in FIG. 2, and pressure can be applied to the conductive foil layer 18 (in the direction of the arrows P). In one embodiment, the application of pressure to the conductive foil layer 18 can be the result of simply overlying the conductive foil layer 18 onto the bare portion 16 of the conductor 12 (e.g., by grasping the ends of the conductive foil layer 18 and wrapping it around the bare portion 16). In certain embodiments, the desired pressure can be applied by hand, with a tool (e.g., pliers), or any of a variety of other suitable methods.

Once the conductive foil layer 18 has been provided onto the bare portion 16 of the conductor 12, the bare portion 16 of the conductor 12 and the conductive foil layer 18 can be joined together. In one embodiment, the bare portion 16 and the conductive foil layer 18 can be joined together through welding, such as through ultrasonic welding, for example. Welding the bare portion 16 and the conductive foil layer 18 together can bond the conductive foil layer 18 to the conductor 12 as well as bond the strands of the conductor 12 together to form an amalgamated mass (e.g., a nugget). Welding can also help break apart any oxidation formed on the conductor 12 that might adversely affect the conductivity between the conductor 12 and the conductive foil layer 18. Welding can accordingly enhance the conductivity characteristics between the conductor 12 and the conductive foil layer 18.

Figure 3:
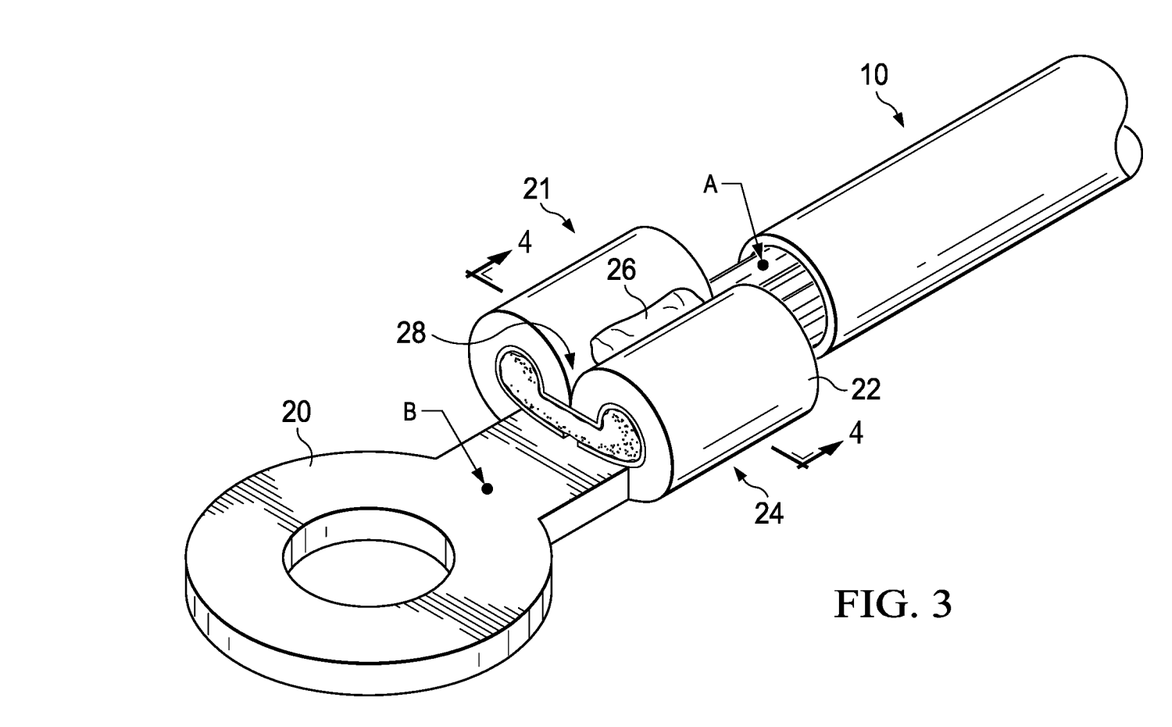
FIG. 3 is a perspective view of the terminal installed on the wire of FIG. 1.
Figure 4:
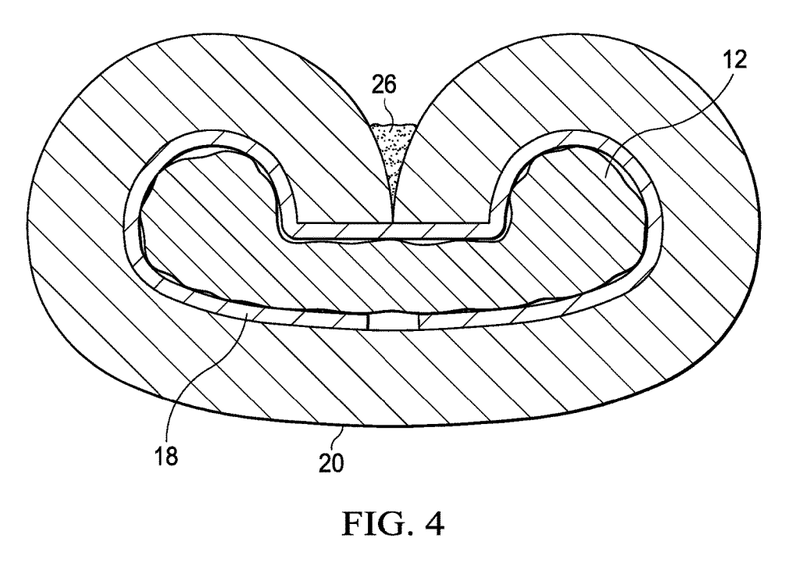
FIG. 4 is a cross-sectional view taken along the line 4-4 in FIG. 3.

Once the conductor 12 and the conductive foil layer 18 have been joined together, a terminal 20 can be slid over the conductive foil layer 18 and secured to the amalgamated mass of the bare portion 16 and the conductor 12, such as with a crimping tool, for example, to create a terminated wire 21, as illustrated in FIGS. 3 and 4. In one embodiment, as illustrated in FIG. 3, an exterior surface 22 of a crimping portion 24 of the terminal 20 can be reinforced, such as by applying solder 26 at a separation point 28 of the crimping portion 24, to enhance the durability of the connection between the terminal 20 and the conductor 12. In certain embodiments, the terminal 20 can be nickel plated, or plated with another conductive material, prior to attachment of the terminal 20 to the conductor 12. In such an embodiment, the nickel plating can protect the terminal from galvanic corrosion to enhance the conductivity between the conductor 12 and the material that forms the terminal 20 (e.g., brass). The terminated end can additionally or alternatively be dipped in molten solder to enhance durability of the terminated wire 21. It is to be appreciated that although the terminal 20 is shown to be a ring terminal, it is to be appreciated that any of a variety of suitable alternative contact elements, such as a slotted terminal, a bus bar, or a termination block, for example, can be attached to the wire 10. It is also to be appreciated that the terminated wire 21 is contemplated for use in a variety of suitable applications, such as, for example, as a vehicular battery cable.

The conductor 12 and the conductive foil layer 18 can be formed of different conductive materials with the conductive foil layer 18 having about the same or higher conductivity than the conductor 12. As a result, when the conductive foil layer 18 is interposed between the conductor 12 and the terminal 20, the conductive foil layer 18 can enhance the overall conductivity between the conductor 12 and the terminal 20 as compared to the conductive foil layer 18 not being present (i.e., the conductor 12 and the terminal 20 being entirely in contact with each other). In one embodiment, the conductor 12 can be formed of aluminum or an aluminum alloy, the conductive foil layer 18 can be formed of copper, and the terminal 20 can be formed of brass. In such an embodiment, the copper of the conductive foil layer 18 can allow the interaction between the aluminum conductor 12 and the brass terminal 20 to be more conductive than crimping the brass terminal 20 directly to the aluminum conductor 12 (which in some instances can be non-conductive). It is to be appreciated that the conductive foil layer 18 can be formed of a material that is as conductive as or more conductive than the conductor 12. In certain embodiments, the conductor 12 can be formed of a conductive material having a conductivity of about $3.5*10^7$ S/m (at 20 degrees C.) or less, and the conductive foil layer 18 can be formed of conductive material having a conductivity of about $4.1*10^7$ S/m (at 20 degrees C.) or more. In other embodiments, the conductor 12 can be formed of a conductive material that is substantially susceptible to oxidation, such as an aluminum alloy, a chromium alloy, and/or a magnesium alloy, and the conductive foil layer 18 can be formed of conductive material that is not substantially susceptible to oxidization such as a copper alloy, silver, nickel, and/or gold. It is to be appreciated that the different metals described above for the conductor 12, the conductive foil layer 18, and the terminal 20 can be any of a variety of different metals or metal alloys, such as, for example copper or copper alloys, such as brass.

As illustrated in FIG. 1, the conductive foil layer 18 is shown to have a length L1, a width W, and a thickness T and the bare portion 16 of the conductor 12 is shown to have a length L2, a diameter D, and a circumference C. In one embodiment, the length L1 and width W of the conductive foil layer 18 can be less than the circumference C and the length L2 of the bare portion 16 of the conductor 12, respectively, such that when the conductive foil layer 18 is attached to the conductor 12, the conductive foil layer 18 neither reaches the end of the conductor 12 nor completely surrounds it. In another embodiment, the length L1 of the conductive foil layer 18 can be more than the circumference C of the bare portion 16 of the conductor 12, respectively, such that when the conductive foil layer 18 is attached to the conductor 12, the conductive foil layer 18 overlaps at its ends such that it entirely surrounds the bare portion 16. In certain embodiments, the diameter D of the conductor can be significantly more than the thickness T of the conductive foil layer 18, and can in certain embodiments have a ratio of between about 100:1 and about 500:1 and in certain embodiments can have a ratio of about 200:1. In one embodiment, for a 0 AWG wire, the length L1 can be about 40 mm, the width W can be about 18 mm, the thickness T can be about 0.035 mm, the length L2 can be about 20 mm, the diameter D can be about 8 mm, and the circumference C can be about 25 mm. It will be appreciated that a layer described herein as being a foil, such as conductive foil layer 18, should be understood to mean that the layer is a sheet-like substrate having a length and width that are substantially greater than the thickness of the substrate. In certain embodiments, ratio of the combined length and width of the layer to the thickness of the layer can be between about 500:1 to about 100,000:1. In certain embodiments, the ratio can be about 10,000:1 to about 25,000:1 and preferably about 14,000:1

In some embodiments, the bare portion 16 of the conductor 12, alone or in combination with the conductive foil layer 18, can be cleaned before or after application of the conductive foil layer 18 to remove any oxides on the conductor 12 and/or between the conductor 12 and the conductive foil layer thus enhancing the effectiveness of the conductivity between the conductor 12, the conductive foil layer 18, and the terminal 20. In one embodiment, the conductor 12 and/or conductive foil layer 18 can be cleaned via a plasma treatment performed by a blown-ion air system (not shown). The blown-ion air system can force pressurized air towards an electrode, through a narrow nozzle, and onto the bare portion 16. The electrode creates positively charged ions in the pressurized air which is then accelerated by the nozzle and provided onto the bare portion 16 of the conductor 12. The positively charged ions in the airstream positively charge the outer surface of the bare portion 16 thereby increasing its surface energy to remove any oxides. In another embodiment, the conductor 12 and/or conductive foil layer 18 can be cleaned via a high temperature induction heating process that applies a flame to the conductor 12 and/or conductive foil layer 18 using any of a variety of fuels, such as, for example, hydrogen gas, alcohol, and/or acetylene.

In certain embodiments, the bare portion 16 of the conductor 12 and the conductive foil layer 18 can be joined by soldering such as by dipping the bare portion 16 and the conductive foil layer 18 together in a molten material (e.g., such as molten tin) or resistance soldering the bare portion 16 and the conductive foil layer 18 together, for example, both of which can enhance the conductivity between the bare portion 16, the conductive foil layer 18, and the terminal 20. It is to be appreciated that cleaning the bare portion 16 and/or the conductive foil layer 18 can encourage the application of solder. However, the soldering can be performed in addition to the welding or in addition to or in lieu of the cleaning described above. It is also to be appreciated that the bare portion 16 and/or the conductive foil layer 18 can undergo any of a variety of other suitable treatment processes to prepare for affixation of the terminal 20.

Figure 5:
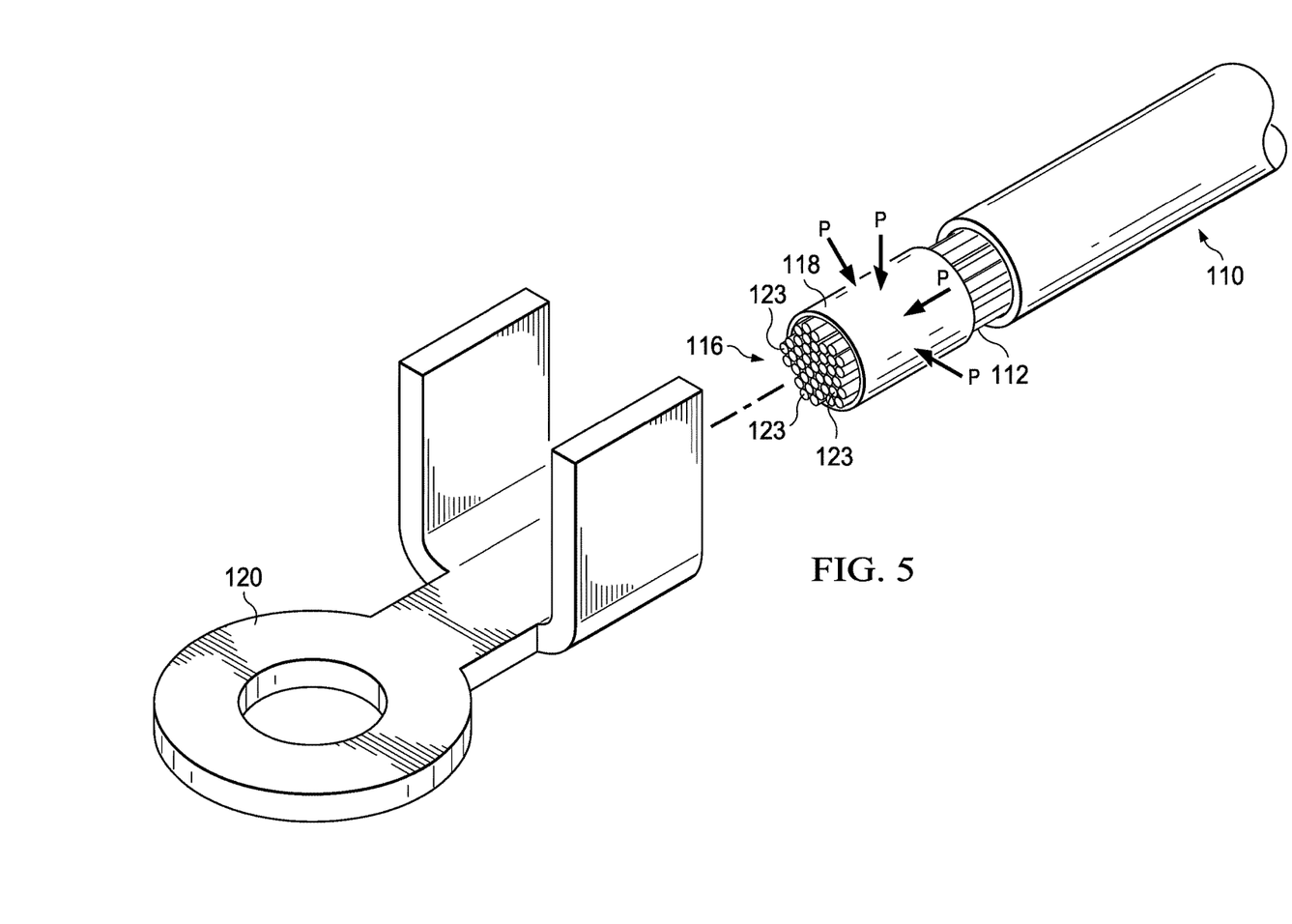
FIG. 5 is a perspective view depicting a wire, a conductive foil layer, and a terminal prior to the conductive foil layer being installed on a conductor of the wire, in accordance with another embodiment.
Figure 6:
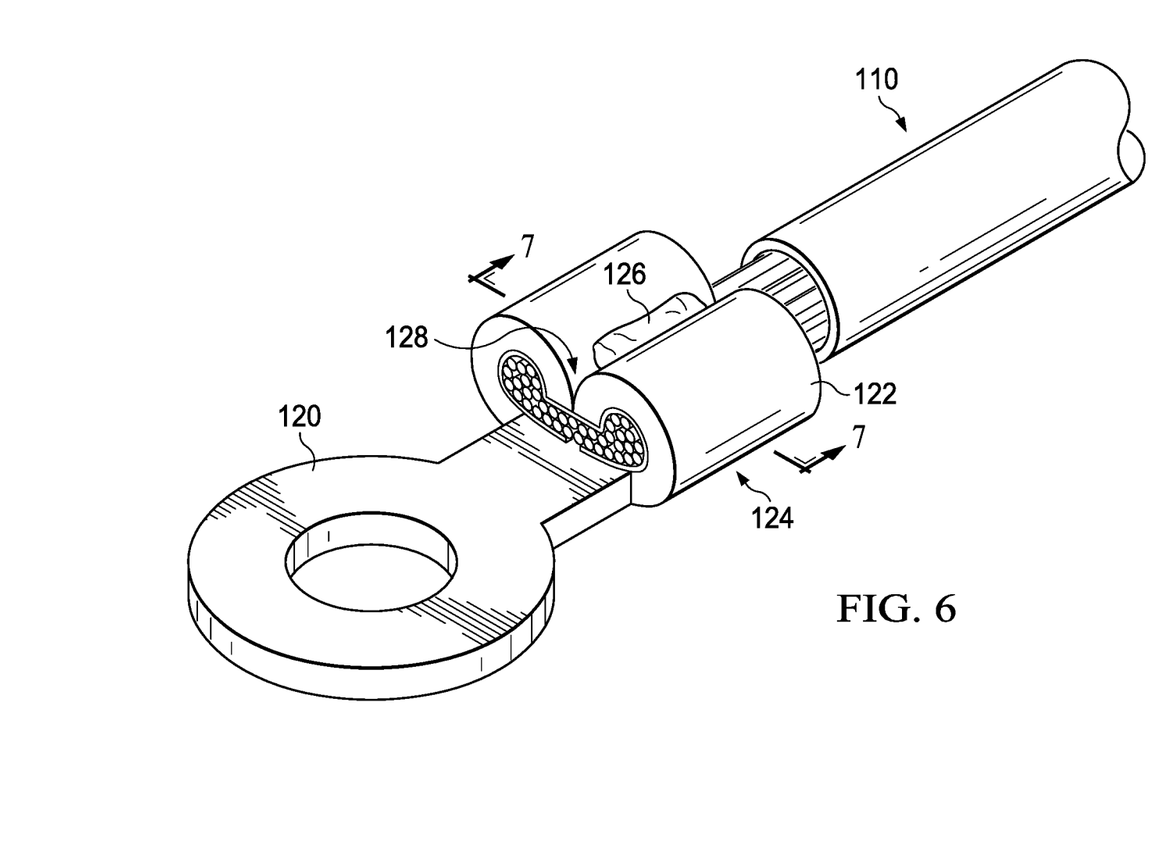
FIG. 6 is a perspective view of the terminal installed on the wire of FIG. 5.
Figure 7:
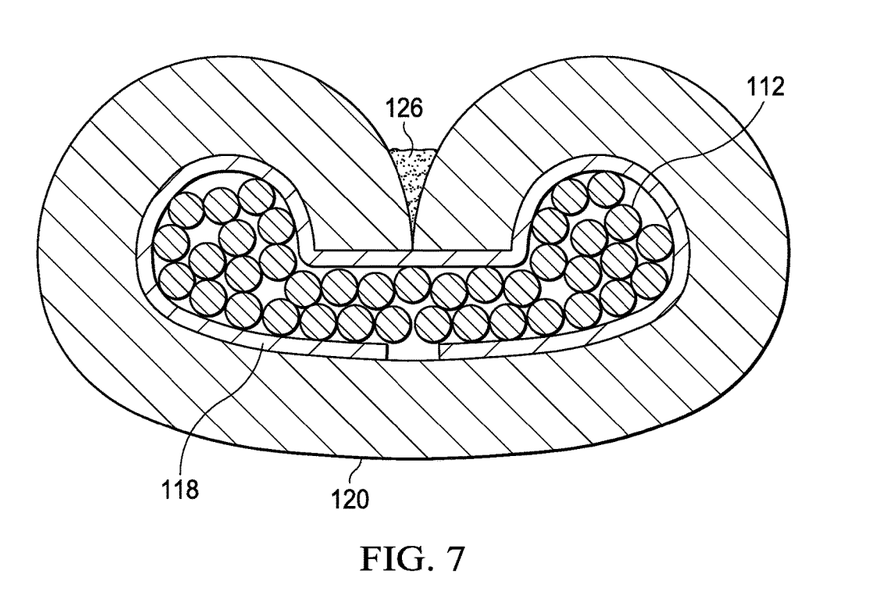
FIG. 7 is a cross-sectional view taken along the line 7-7 in FIG. 6.

FIGS. 5-7 illustrate a wire 110, a conductive foil layer 118 and a terminal 120 that are similar to, or the same in many respects as, the wire 10, the conductive foil layer 18 and the terminal 120, respectively, illustrated in FIGS. 1-4. For example, the wire 110 can include a conductor 112, an insulating layer 114, a bare portion 116, and a conductive foil layer 118. However, the conductive foil layer 118 can be joined to the bare portion 116 of the conductor 112 by applying pressure to the conductive foil layer 118 (in the direction of the arrows P) and without any welding (ultrasonic or otherwise). In such an arrangement, the terminal 20 can be slid over the bundle of strands (e.g., 123) at the bare portion 16 and secured to the bundle of strands (e.g., 123), such as with a crimping tool, for example. An exterior surface 122 of a crimping portion 124 of the terminal 120 can be reinforced, such as by applying solder 126 at a separation point 128 of the crimping portion 124.

Figure 8:
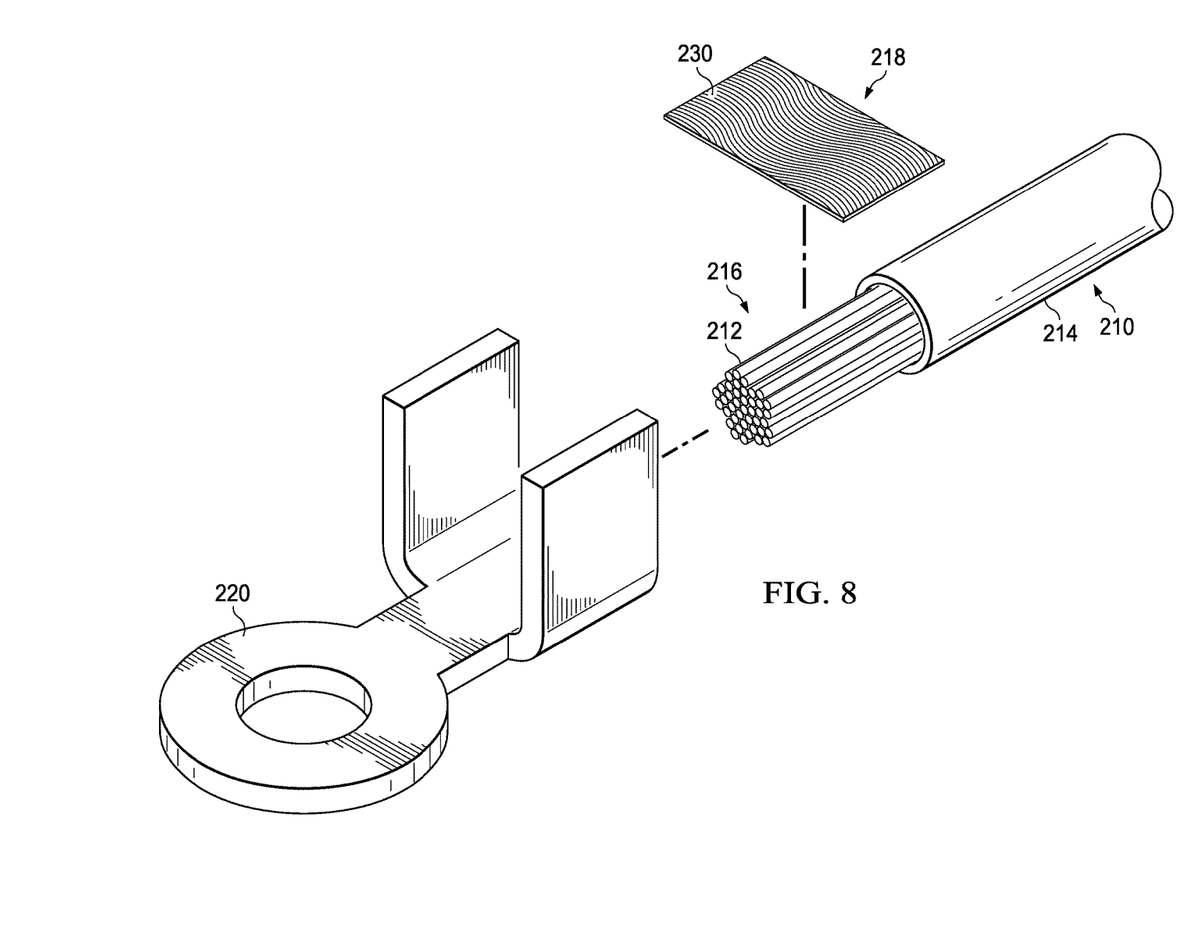
FIG. 8 a perspective view depicting a wire, a conductive foil layer, and a terminal prior to the conductive foil layer being installed on a conductor of the wire, in accordance with another embodiment.

FIG. 8 illustrates a wire 210, a conductive foil layer 218 and a terminal 220 that are similar to, or the same, in many respects as the wire 10, the conductive foil layer 18 and the terminal 20, respectively, illustrated in FIGS. 1-4. For example, the wire 210 can include a conductor 212, an insulating layer 214, and a bare portion 216. The conductive foil layer 218, however, can be a corrugated screen having a plurality of elevated portions (e.g., points) distributed along upper and lower surfaces (upper surface 230 shown).

When the conductive foil layer 218 is attached to the bare portion 216 of the conductor 212, the points can abrade the bare portion 216 of the conductor 212 (e.g., remove any oxidation) to facilitate effective electrical contact between the bare portion and the conductive foil layer 218. If the bare portion 216 and the conductive foil layer 218 are joined by soldering, as described above, the solder can collect in pockets defined between the points to facilitate effective bonding between the bare portion 216 and the conductive foil layer 218. In one embodiment, the conductive foil layer 218 can be formed of nickel and the conductor 212 can be formed of aluminum 212.

Figures 9, 10:
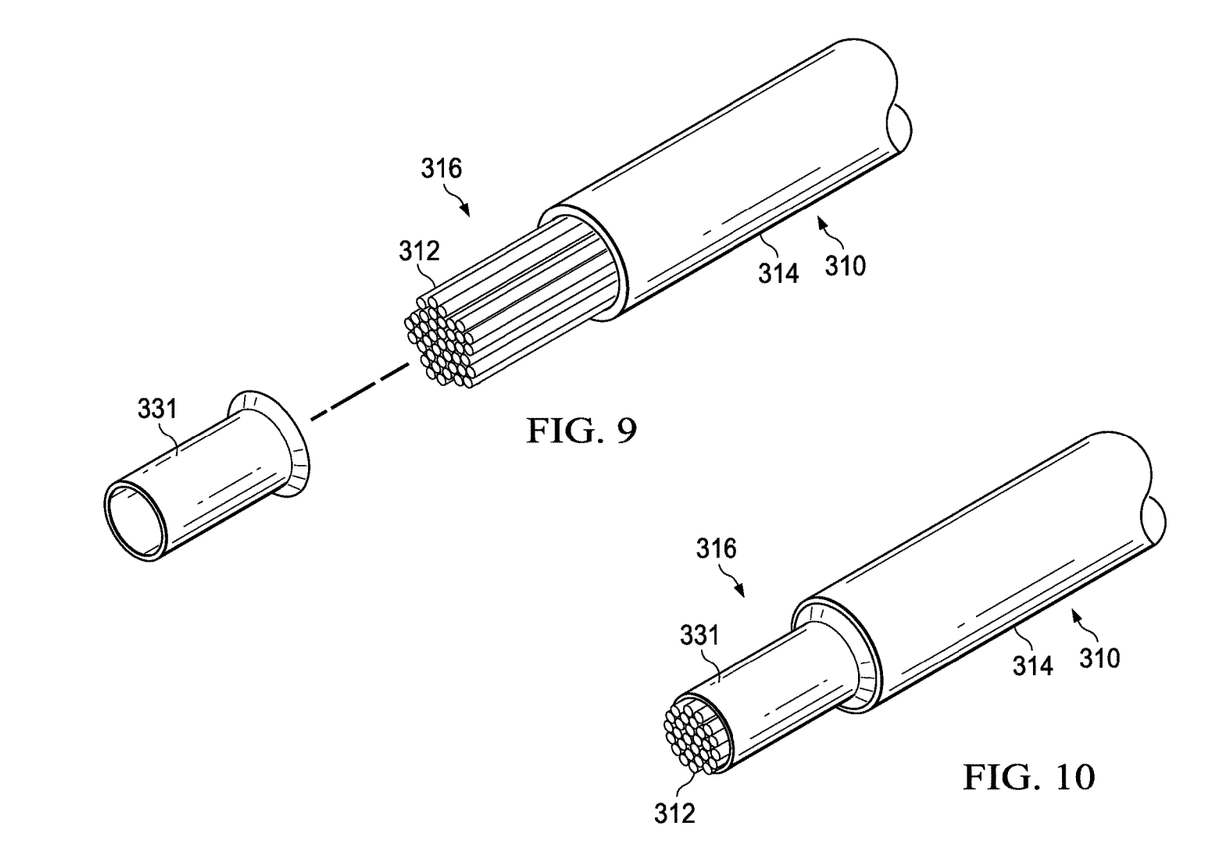
FIG. 9 is a perspective view depicting a wire and ferrule prior to the ferrule being installed on a conductor of the wire, in accordance with another embodiment.
FIG. 10 is a perspective view of the wire of FIG. 9, but with the ferrule installed on the conductor.

FIGS. 9-10 illustrate a wire 310 that is similar to, or the same, in many respects as the wire 10 illustrated in FIGS. 1-4. For example, the wire 310 can include a conductor 312, an insulating layer 314, and a bare portion 316. A ferrule 331, however, can be provided in lieu of, or in addition to, a conductive foil layer (e.g., 18). The ferrule 331 can be joined to the bare portion similarly as described above and a terminal (not shown) can then be secured thereto.

Another alternative embodiment of a terminated wire (e.g., an alternative terminated wire) is also contemplated. The alternative terminated wire can be similar in many respects to the terminated wire 21 described above except that the alternative terminated wire does not include a conductive foil layer (e.g., 18). To prepare the alternative terminated wire, a portion of an insulating layer (e.g., 14) can be removed from a conductor (e.g., 12) to expose a bare portion (e.g., 16) of the conductor (e.g., 12). The bare portion can then be cleaned (e.g., with a plasma treatment) and welded (e.g., through ultrasonic welding) to bind individual strands of the conductor together. The steps of cleaning and welding can be performed in any order. Once welded, the bare portion can be soldered (e.g., through tin dipping or resistive soldering). A terminal (e.g., 20) can then be attached to the bare portion insulating layer to create the alternative terminated wire. In one embodiment, the conductor 112 can be formed of aluminum and the conductive foil layer can be formed of nickel.

EXAMPLES

Testing was conducted on a terminated wire similar to the terminated wire 21 described above. The terminated wire that was tested was a 0 AWG (1/0) aluminum wire having a bare portion (e.g., 14) measuring about 20 mm, a copper conductive foil layer (e.g., 18) having a length (e.g., L1) of about 40 mm, a width (e.g., W) of about 18 mm, and a thickness (e.g., T) of about 0.035 mm, and a brass terminal. The copper conductive foil layer was manually wrapped onto the bare portion and then was ultrasonically welded to form a nugget. A terminal was then crimped onto the nugget. Ten separate resistance tests were then performed to measure the resistance between the conductor and the terminal (e.g., between points A and B illustrated on FIG. 3). Each test resulted in a resistance between 0.041 Ohms and 0.045 Ohms, having an example resistance of 0.043 Ohms. The maximum allowable resistance for use as a vehicular battery cable is 0.057 Ohms.

Comparative testing was also conducted to compare the results for different terminations of a 0 AWG (1/0) aluminum wire having a bare portion (e.g., 14) measuring about 20 mm, a copper conductive foil layer (e.g., 18) having a length (e.g., L1) of about 40 mm, a width (e.g., W) of about 20 mm, and a thickness (e.g., T) of about 0.035 mm, and a brass terminal. A variety of different terminated wires were assembled using certain of the methodologies described above and resistance tests were performed on the terminated wires. The results of the resistance tests are as follows:

| Example | Termination Method | Resistance (Ohms) |
|---|---|---|
| Example #1 | Bare Conductor with Terminal Crimped Directly to Bare Conductor | Open Circuit (high resistance) |
| Example #2 | Terminated Conductor Prepared and Terminated Without Conductive Foil Layer as Follows:<br>1. Ultrasonically Weld Bare Conductor<br>2. Plasma Clean Welded Bare Conductor<br>3. Dip Bare Conductor in Molten Solder<br>4. Crimp Terminal to Soldered End of Bare Conductor.<br>5. Resistance Solder Outer Surface of Terminal | 0.345 milliohms |
| Example #3 | Terminated Conductor Prepared and Terminated Without Conductive Foil Layer as Follows:<br>1. Plasma Clean Bare Conductor<br>2. Ultrasonically Weld Bare Conductor<br>3. Plasma Clean Bare Conductor<br>4. Dip Bare Conductor in Molten Solder<br>5. Crimp Terminal to Soldered End of Bare Conductor.<br>6. Resistance Solder Outer Surface of Terminal | 0.179 milliohms |
| Example #4 | Terminated Conductor Prepared and Terminated With Solid Copper Conductive Foil Layer as Follows:<br>1. Ultrasonically Weld Bare Conductor and Conductive Foil Layer Together<br>2. Dip Welded End in Molten Solder<br>3. Crimp Terminal to Soldered End of Bare Conductor.<br>4. Resistance Solder Outer Surface of Terminal | 0.046 milliohms |

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A terminated wire consisting of:
   a conductor comprising an exposed portion and being formed of a first material;
   an insulating layer circumferentially surrounding a portion of the conductor adjacent to the exposed portion;
   a conductive layer formed of a second material and joined to the exposed portion of the conductor such that the exposed portion of the conductor and the conductive layer cooperate to form an amalgamated mass; and
   a contact element formed of a third material and secured to the amalgamated mass; wherein:
      the first material and the second material are different; and
      the exposed portion of the conductor and the conductive layer are substantially the same length.

2. The terminated wire of claim 1 wherein the first material and the third material are different.

3. The terminated wire of claim 2 wherein the first material comprises an aluminum alloy, the second material comprises copper, and the third material comprises a copper alloy.

4. The terminated wire of claim 1 wherein the third material comprises brass.

5. The terminated wire of claim 1 wherein the conductive layer and the exposed portion of the conductor are joined together by welding.

6. The terminated wire of claim 5 wherein the conductive layer and the exposed portion of the conductor are joined together by ultrasonic welding.

7. The terminated wire of claim 1 wherein the conductor has a diameter, the conductive layer has a thickness, and the ratio of the diameter of the conductor to the thickness of the conductive layer is about 200:1.

8. The terminated wire of claim 1 wherein the contact element comprises a crimped terminal.

9. The terminated wire of claim 1 wherein the conductive layer comprises a ferrule.

10. The terminated wire of claim 9 wherein the ferrule comprises a hollow sleeve that defines respective openings at opposite ends of the hollow sleeve.

11. A terminated wire consisting of:
    a conductor comprising an exposed portion and being formed of a first material;
    a conductive layer formed of a second material and joined to the exposed portion of the conductor such that the exposed portion of the conductor and the conductive layer cooperate to form an amalgamated mass; and
    a contact element formed of a third material and secured to the amalgamated mass; wherein:
       the first material and the second material are different; and
       the exposed portion of the conductor and the conductive layer are substantially the same length.

12. The terminated wire of claim 11 wherein:
    the first material comprises an aluminum alloy;
    the second material comprises copper;
    the conductive layer and the exposed portion of the conductor are joined together by ultrasonic welding;
    the contact element comprises a crimped terminal; and
    the conductive layer comprises a ferrule.

13. A method for installing a contact element on a wire, the wire comprising a conductor, the conductor comprising an exposed portion and being formed of a first material, the method consisting of:
  joining a conductive layer and the exposed portion of the conductor together to form an amalgamated mass; and
  securing the contact element to the amalgamated mass, wherein:
    the conductive layer is formed of a second material;
    the contact element is formed of a third material;
    the first material and the second material are different; and
    the exposed portion of the conductor and the conductive layer are substantially the same length.

14. The method of claim 13 wherein joining the conductive layer and the exposed portion of the conductor together comprises welding the conductive layer and the exposed portion of the conductor together.

15. The method of claim 14 wherein welding the conductive layer and the exposed portion of the conductor together comprises ultrasonically welding the conductive layer and the exposed portion of the conductor together.

16. The method of claim 13 wherein securing the contact element to the amalgamated mass comprises crimping the contact element to the amalgamated mass.

17. The method of claim 13 wherein the first material comprises aluminum, the second material comprises copper, and the third material comprises a copper alloy.

18. The method of claim 13 wherein the conductor has a diameter, the conductive layer has a thickness, and the ratio of the diameter of the conductor to the thickness of the conductive layer is about 200:1.

19. The method of claim 13 wherein the conductive layer comprises a ferrule.

20. The method of claim 19 wherein the ferrule comprises a hollow sleeve that defines respective openings at opposite ends of the hollow sleeve.

\* \* \* \* \*